Oct. 21, 1924.  
J. M. SANDFORD  
LIFTING HOOK  
Filed May 18, 1923  
1,512,315
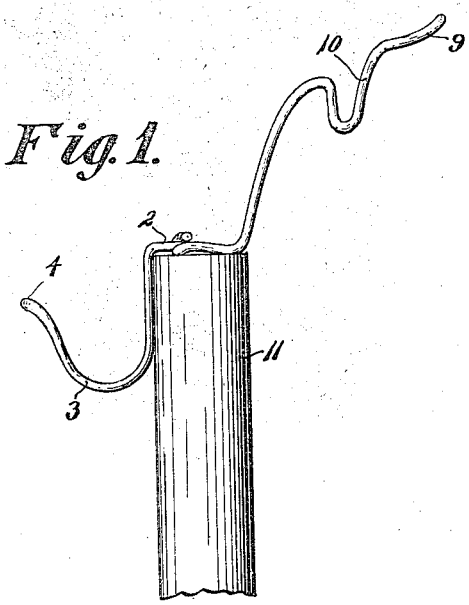
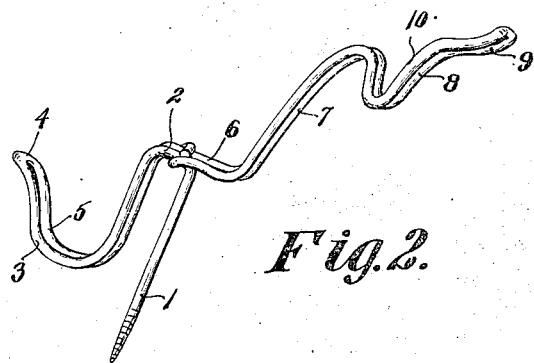
Julia M. Sandford.
INVENTOR
BY Victor J. Evans.
ATTORNEY
WITNESS:

Patented Oct. 21, 1924.

1,512,315

UNITED STATES PATENT OFFICE.

JULIA M. SANDFORD, OF SEATTLE, WASHINGTON.

LIFTING HOOK.

Application filed May 18, 1923. Serial No. 639,915.

*To all whom it may concern:*

Be it known that I, JULIA M. SANDFORD, a citizen of the United States, residing at Seattle, in the county of King and State of Washington, have invented new and useful Improvements in Lifting Hooks, of which the following is a specification.

The object of this invention is to produce a lifting hook primarily designed for hanging clothes in elevated supports in closets or the like, and which is constructed from a single strand of wire having a screw end which is attached to a suitable wooden handle.

A further object is to produce a lifting hook formed from a single strand of wire bent upon itself to provide a straight portion that rests on the outer end of a rod or pole and which is formed with a screw that enters the said rod or pole. From the straight portion the wire is bent downwardly against one side of the pole and from thence continued outwardly to provide a lower hook, the opposite ends of the wire strands being rounded upwardly, inwardly and outwardly to provide the second hook of the construction, the last mentioned hook being designed for supporting light-weight clothes, while the first mentioned hook being reinforced by contacting engagement with the pole is of a stronger construction than the other hook and is designed for supporting heavy garments.

With these and other objects in view this invention will be better understood from the following detailed description taken in connection with the accompanying drawing wherein:—

Figure 1 is a view of the improvement attached to a pole.

Figure 2 is a perspective view of the improvement per se.

As disclosed by the drawing, my lifting hook is formed from a single strand of wire having one end pointed and threaded, as at 1. The screw end 1 of the hook has its upper portion bent to provide a rightangular extension 2, the said extension being rounded downwardly and upwardly to provide one of the sides 3 of one of the hooks of the improvement. The end of the side 3 is rounded upon itself, as at 4 and is from thence continued to provide the second side 5 of the hook. The side 5 is extended in the same plane as the portion 2, but is projected therebeyond, as indicated by the numeral 6. The straight portion 6 is arranged at an upward and outward curvature, as at 7 providing one of the sides of the second or upper hook. The portion 7 is rounded downwardly and from thence upwardly forming one side 8 of the upper hook proper. The side 8 has its upper portion extended for a short distance in a substantially straight plane and is from thence rounded upwardly to form one side of the beak 9 for the hook 8. The strand comprising the beak is rounded upon itself and is extended rearwardly and from thence downwardly to provide the second side of the hook. From the upper portion of the side 10 of the hook the strand is rounded downwardly in a line with the side 7 and is from thence extended inwardly along the straight side 6 and is bent around the screw 1 and over both the straight sides 6 and 2 of the improvement. The screw 1 is let in a handle or pole 11, and the inner portion of the lower hook rests against a side of the pole and is reinforced and strengthened by contact therewith. The lower hook is designed for engaging heavy garments while the upper hook is designed for engaging lighter garments. The strap of the garment is guided on to the upper hook by the engagement of the beak of the latter therewith, and it is thought that the foregoing description when taken in connection with the drawing will fully set forth the construction and advantages of the improvement to those skilled in the art to which such inventions relate.

Having described the invention, I claim:—

1. The combination with a pole or handle, of a double hook thereon, including a straight portion which rests on one end of the handle, a screw extending centrally from the said straight portion and entering the handle, a lower hook at one end of the straight portion whose inner wall is in contact with a side of the handle, an upwardly and outwardly rounded portion extended from the opposite end of the said straight portion rounded inwardly and outwardly upon itself to provide a second hook, and the outer wall of the hook having its end extended outwardly and upwardly to provide a directing beak for said hook.

2. The combination with a pole or handle, of a double hook thereon constructed from a single strand of wire to include a central straight portion having an end terminating in a downturned screw which is let in one end of the handle to allow the said straight portion to rest on the said end of the handle, said straight portion being rounded downwardly and upwardly to provide one side of a hook, the end of which being bent and rounded to provide the second side of the hook and the inner wall of the hook contacting with a side of the handle, said strand being continued over the handle and from thence rounded upwardly and outwardly as well as downwardly and outwardly to form one side of a hook and from thence continued upwardly and outwardly to provide one side of a directing beak for the hook, said strand being bent to provide the second side of the beak, the hook and the said upwardly rounded portion and terminating in a straight portion which rests over the handle and is bent under and over the first mentioned straight portions of the handle and thence bent under in contacting engagement with the screw and over the first mentioned straight portions of the hook.

In testimony whereof I affix my signature.

JULIA M. SANDFORD.